(12) United States Patent
Nadabar et al.

(10) Patent No.: US 7,412,106 B1
(45) Date of Patent: Aug. 12, 2008

(54) METHODS FOR LOCATING AND DECODING DISTORTED TWO-DIMENSIONAL MATRIX SYMBOLS

(75) Inventors: Sateesha Nadabar, Framingham, MA (US); Xiangyun Ye, Framingham, MA (US)

(73) Assignee: Cognex Technology and Investment Corporation, Mt. View, CA (US)

( * ) Notice: Subject to any disclaimer, the term of this patent is extended or adjusted under 35 U.S.C. 154(b) by 546 days.

(21) Appl. No.: 11/165,922

(22) Filed: Jun. 25, 2005

(51) Int. Cl.
*G06K 9/40* (2006.01)

(52) U.S. Cl. .................. 382/254; 382/205; 382/263; 382/264; 345/611; 345/687

(58) Field of Classification Search .............. 73/156; 345/611, 687, FOR. 156; 348/252, 405.1, 348/408.1, 606, 625; 358/3.27, 426.03, 426.04, 358/405, 532; 382/205, 254, 263, 264; 700/73; 708/136
See application file for complete search history.

(56) References Cited

U.S. PATENT DOCUMENTS 6,108,453 A * 8/2000 Acharya .................. 382/254
6,707,950 B1 * 3/2004 Burns et al. .............. 382/254

FOREIGN PATENT DOCUMENTS

JP         2002300402 A  * 10/2002

* cited by examiner

*Primary Examiner*—Matthew C. Bella
*Assistant Examiner*—Gregory F Cunningham
(74) *Attorney, Agent, or Firm*—Russ Weinzimmer

(57) ABSTRACT

A method is presented for processing an image of a two-dimensional (2D) matrix symbol having a plurality of data modules and a discontinuous finder pattern, each distorted by "donut effects". A resulting processed image contains an image of the 2D matrix symbol having a continuous finder pattern suitable for conventional 2D matrix symbol locating techniques, and having a plurality of data modules, each data module having a center more truly representative of intended data, and suitable for conventional 2D matrix symbol sampling and decoding. The method includes sharpening the distorted image of the 2D matrix symbol to increase a difference between low frequency and high frequency image feature magnitudes, thereby providing a sharpened image, and smoothing the sharpened image using a moving window over the sharpened image so as to provide a smoothed image, the moving window and a module of the 2D matrix code being of substantially similar size.

31 Claims, 10 Drawing Sheets

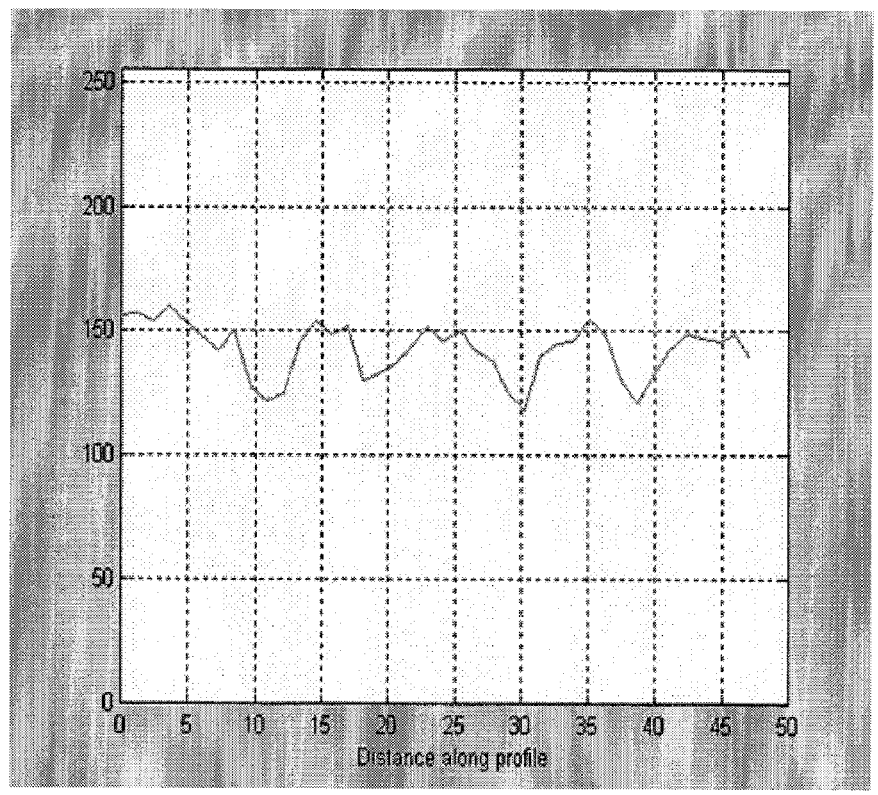
Figure 8(a-1)
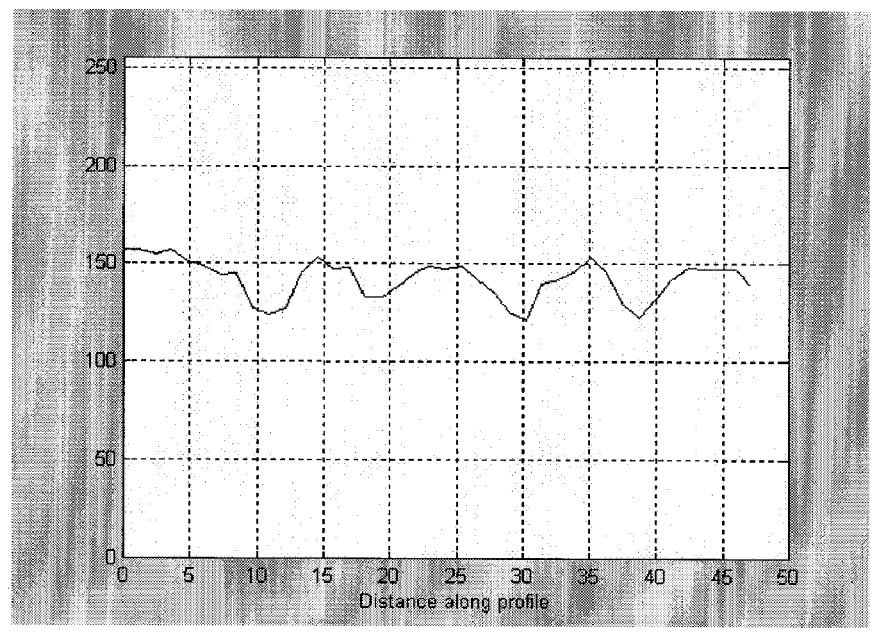
Figure 8(a-2)

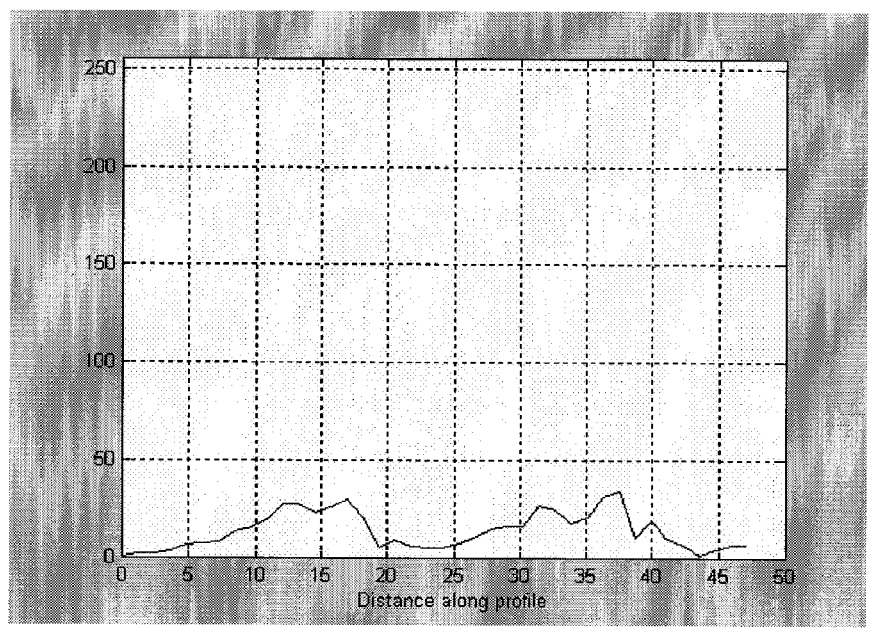
Figure 8(a-3)
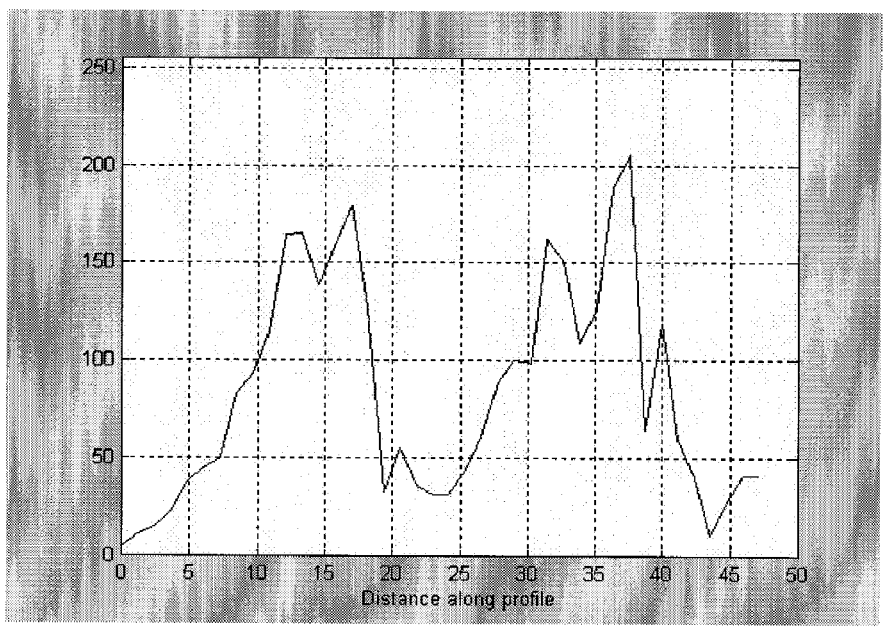
Figure 8(a-4)

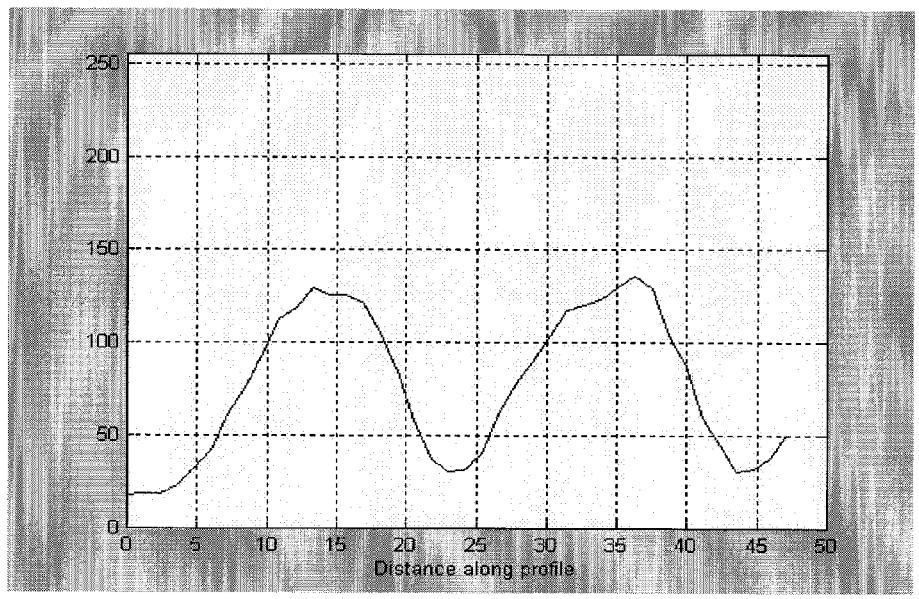
Figure 8(a-5)

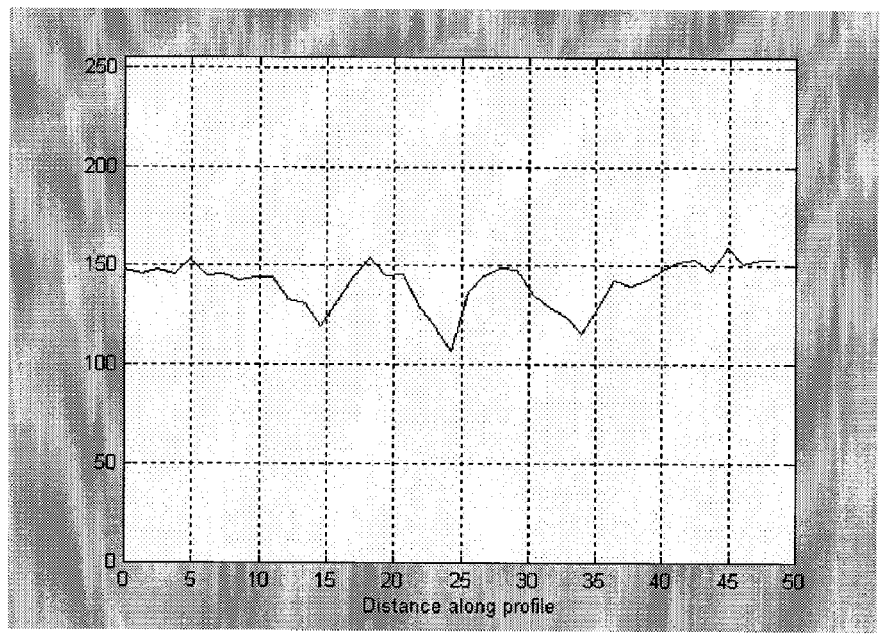
Figure 8(b-1)
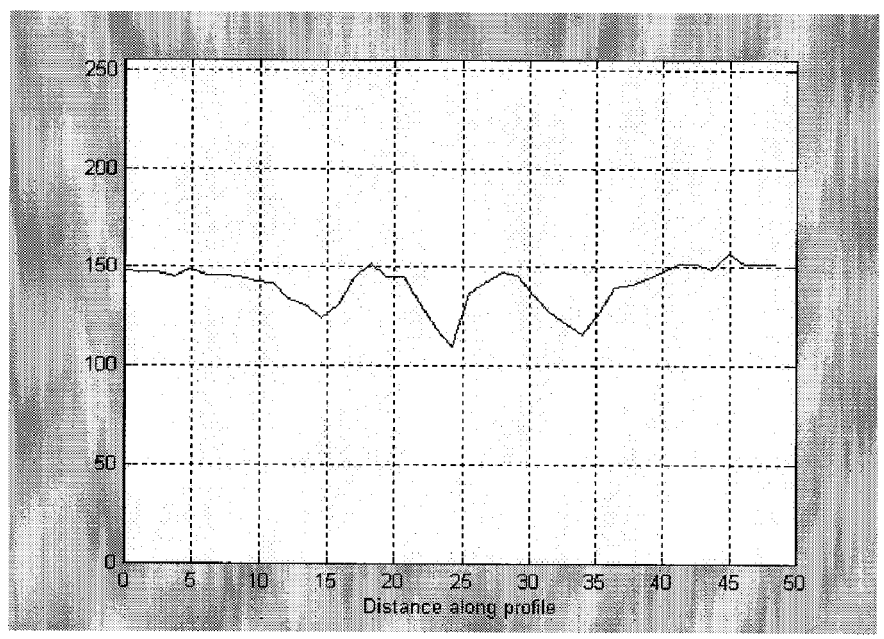
Figure 8(b-2)

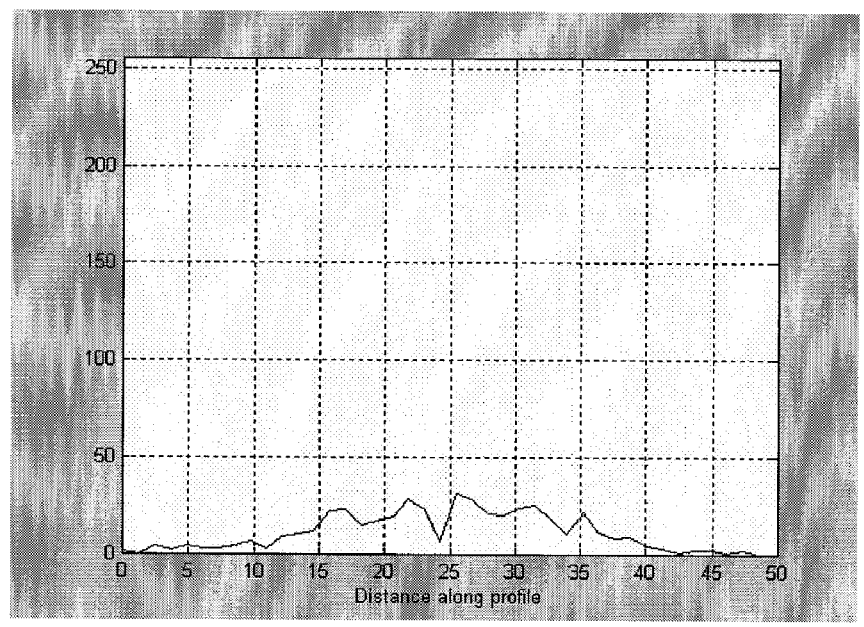
Figure 8(b-3)
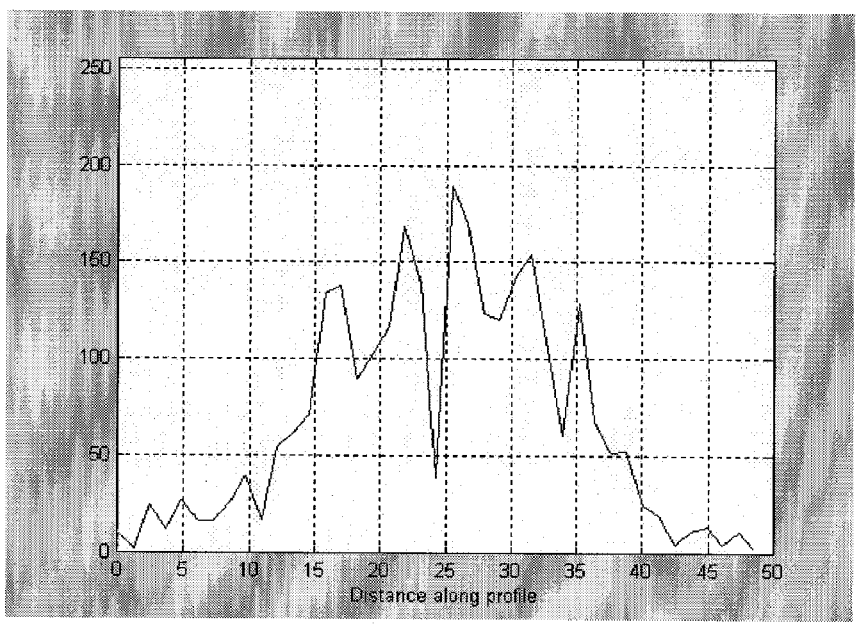
Figure 8(b-4)

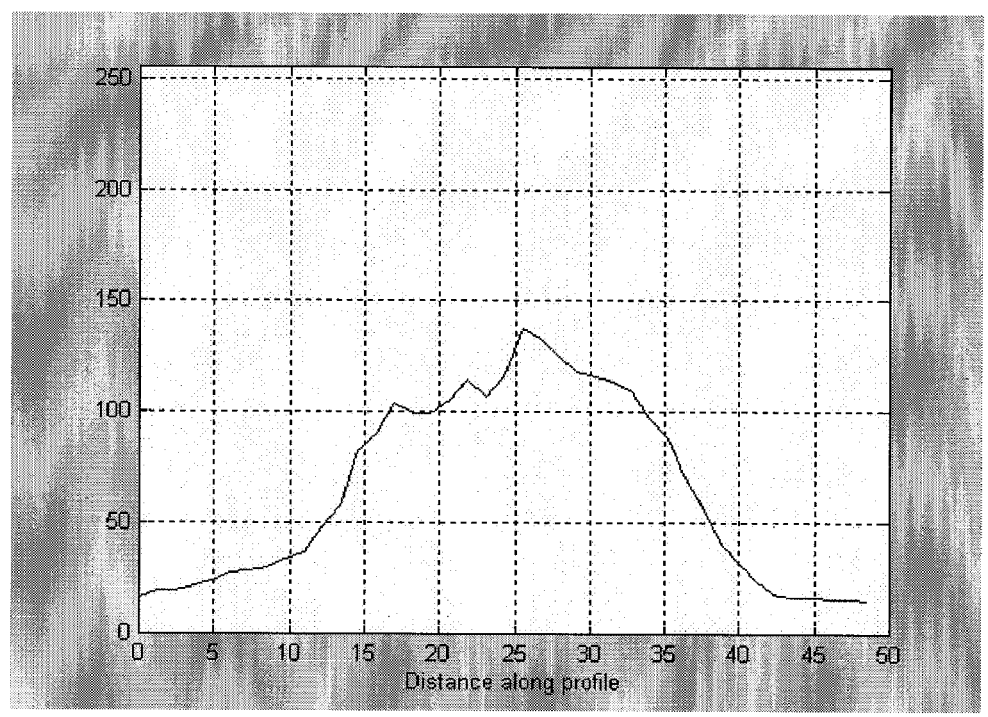
Figure 8(b-5)

METHODS FOR LOCATING AND DECODING DISTORTED TWO-DIMENSIONAL MATRIX SYMBOLS

FIELD OF THE INVENTION

This invention relates to image processing for enhanced image interpretation, and particularly to image processing for enhanced location and/or decoding of two-dimensional (2D) matrix symbols.

BACKGROUND OF THE INVENTION

With reference to FIG. 1, an example of a two-dimensional (2) matrix symbol is a DataMatrix symbol 10, which typically includes a data area 12 having a plurality of data "modules" arranged in a two-dimensional matrix, the data area 12 being bound on two sides by a finder pattern 14, and on two opposite sides by a timing pattern 16. Each data module of the data area 12 can be a square, a rectangle, or a circle, for example. Each data module is a solid 2-D region of either positive polarity (e.g., black), or negative polarity (e.g., white), the polarity representing a data value of 1 or 0, for example. The DataMatrix symbol 10 also includes a "quiet zone" 18 surrounding the finder pattern 14 and the timing pattern 16, which together surround the data area 12. The timing pattern 16 is used to determine the extent of the symbol, and to estimate the number of rows and columns in the symbol.

FIG. 1 illustrates the structure of an ECC200 dark-on-light DataMatrix symbol. The finder pattern 14 of the DataMatrix symbol 10 consists of a plurality of contiguous ideally square modules that form a continuous L-shaped boundary. The Reference Decode Algorithm for the DataMatrix code (ISO/IEC2000: 16022, Information technology—International symbology specification—Data matrix) can be used to locate candidate areas that may contain an "L" shaped finder pattern.

2D matrix symbols are used for tracking objects during transit, storage, or for any object identification purpose. Such symbols can be printed on the object, or can be stamped or otherwise impressed into the surface of an object, such as a malleable object, e.g., a plastic or metal object. One method of stamping a 2D matrix symbol into a metal surface uses a plurality of "peens", i.e., round objects that each forms a round depression (dot) in the surface of the metal.

With reference to FIG. 2B, when attempting to read a 2D matrix symbol 20 that is dot-peened onto a metal surface 22, the acquired image may present individual modules as rings or "donuts", with the center of each ring having a value (black or white) that is the opposite of the actual intended value of the module. Thus, each distorted module does not reliably represent the data value of the corresponding module of the original 2D matrix symbol. This type of image distortion of a 2D matrix symbol is referred to herein as the "donut effect". Depending on the physical depth of the dots of the symbol 20 peened on the metal surface 22, and the illumination set up for viewing the metal surface 22, the radii of the inner circle can vary to such an extent that conventional decoding algorithms fail to correctly read the code. "Donut effects" can also result when a code is marked on metal and then covered with paint, which changes the appearance of the modules due to the build-up of paint caught in the basin of each peened module of the symbol, thereby changing the polarity of at least some of the modules.

SUMMARY OF THE INVENTION

In one general aspect, the invention is a method for processing an image of a two-dimensional (2D) matrix symbol having a plurality of data modules and a discontinuous finder pattern, each distorted by "donut effects" such that a resulting processed image contains an image of the 2D matrix symbol having a continuous finder pattern suitable for conventional 2D matrix symbol locating techniques, and having a plurality of data modules, each data module having a center more truly representative of intended data, and suitable for conventional 2D matrix symbol sampling and decoding. The method includes: sharpening the distorted image of the 2D matrix symbol so as to increase a difference between low frequency image feature magnitudes and high frequency image feature magnitudes, thereby providing a sharpened image; and smoothing the sharpened image using a moving window over the sharpened image so as to provide a smoothed image, the moving window and a module of the 2D matrix code being of substantially similar size.

In a preferred embodiment, the moving window visits a plurality of module locations. In another preferred embodiment, the moving window visits a plurality of pixel locations. In yet another preferred embodiment, the moving window visits a plurality of sub-pixel locations.

In preferred embodiments, sharpening includes using a Sobel gradient magnitude operator. In other preferred embodiments, sharpening includes using one of a Laplacian filter; a Mexican hat filter; a Roberts gradient magnitude operator; a Difference-of-Gaussian filter; a Rank Filter; and a Top-hat filter.

In a preferred embodiment, smoothing the sharpened image using a moving window includes applying a weighted smoothing function within the moving window. In a further preferred embodiment, the weighted smoothing function is a Gaussian function.

In yet more preferred embodiments, smoothing the sharpened image using a moving window includes applying an average smoothing function within the moving window. In further preferred embodiments, smoothing the sharpened image using a moving window includes morphological dilation. In yet further preferred embodiments, smoothing the sharpened image using a moving window includes morphological dilation, followed by morphological erosion. In still more preferred embodiments, smoothing the sharpened image using a moving window includes Median filtering.

In another preferred embodiment, the Gaussian function of the moving window is sized such that the sigma of the Gaussian function is one sixth of one less than a size of a module.

In an additional preferred embodiment, the moving window is sized such that, at a center of a "donut effect" ring that is substantially equal in size to a module size, a magnitude of the smoothed image at the center will be sufficient for correct sampling and decoding.

In another preferred embodiment, the method includes prior to sharpening, removing noise so as to improve signal-to-noise-ratio. In a further preferred embodiment, removing noise includes applying a smoothing filter to the image of a 2D matrix code. In a yet further preferred embodiment, the smoothing filter is a kernel of a size that is substantially smaller with respect to a module of the 2D matrix code.

In a further preferred embodiment, removing noise includes at least one of Gaussian smoothing, weighted smoothing, average smoothing, and median filtering.

In another preferred embodiment, the method further includes amplifying the sharpened image so as to increase contrast in the sharpened image. In a further preferred embodiment, amplifying the sharpened image includes multiplying each gray value of the sharpened image by a constant factor. In another preferred embodiment, amplifying the sharpened image includes histogram equalization. In another preferred embodiment, amplifying the sharpened image includes non-linear gray level mapping.

In a preferred embodiment, the method further includes repeating the method at different resolutions so as to expand operating range over a variety of module sizes. In a further preferred embodiment, retrying at different resolutions includes sub-sampling the image prior to repeating the method.

In another preferred embodiment, method is repeated so as to repeat smoothing the sharpened image using a moving window by using a moving window of a different size for each repetition of the method, if the module size is unknown.

In yet another preferred embodiment, the "donut" effect refers to any imperfection in shape of a module that would prevent a module from contacting a neighboring module of the same polarity, and would result in module having a pixel value of a wrong polarity at its geometric center or its center-of-mass. In a further preferred embodiment, imperfections in shape include donut shape, square ring, crescent, and oval.

In another general aspect, the invention is a method for processing an image of a two-dimensional (2D) matrix code having a plurality of data modules and a discontinuous finder pattern, each distorted by "donut effects" such that a resulting processed image contains an image of the 2D matrix code having a continuous finder pattern suitable for conventional data matrix locating techniques, and having a plurality of data modules, each data module having a center more truly representative of intended data, and suitable for conventional 2D matrix symbol sampling and decoding. In this aspect, the method includes: removing noise from the distorted image so as to provide a noise-reduced image with improved signal-to-noise-ratio; sharpening the noise-reduced image so as to remove low frequency image features while preserving high frequency image features, thereby providing a high-pass filtered image; amplifying the sharpened image so as to increase contrast in the sharpened image, thereby providing an amplified sharpened image; and smoothing the amplified high-pass filtered image using a moving window over the high-pass filtered image so as to provide a smoothed image, the moving window and a module of the 2D matrix code being of substantially similar size.

In a preferred embodiment, the method further includes repeating the method at different resolutions so as to expand operating range over a variety of module sizes. In a further preferred embodiment, sharpening includes computing gradient magnitude at each pixel using a Sobel edge detector.

In another preferred embodiment, smoothing the amplified sharpened image includes convolving the amplified sharpened image with a smoothing kernel.

In another general aspect, the invention is a method for decoding a distorted image of a 2D matrix symbol. The method includes: sharpening the distorted image of the 2D matrix symbol so as to increase a difference between low frequency image feature magnitudes and high frequency image feature magnitudes, thereby providing a sharpened image; smoothing the sharpened image using a moving window over the sharpened image so as to provide a smoothed image, the moving window and a module of the 2D matrix code being of substantially similar size; and sampling and decoding the 2D matrix symbol.

In a preferred embodiment, the method further includes locating the 2D matrix symbol after preprocessing.

In another preferred embodiment, the method further includes locating the 2D matrix symbol before preprocessing.

Another general aspect of the invention is a method for verifying a 2D matrix symbol including: sharpening an image of the 2D matrix symbol so as to increase a difference between low frequency image feature magnitudes and high frequency image feature magnitudes, thereby providing a sharpened image; smoothing the sharpened image using a moving window over the sharpened image so as to provide a smoothed image, the moving window and a module of the 2D matrix code being of substantially similar size; sampling and decoding the 2D matrix symbol so as to provide decoded symbol, and a binary pattern of the decoded symbol; and comparing the binary pattern of the decoded symbol with an ideal pattern of the decoded symbol.

The invention enables reliable and robust reading of 2D matrix symbols that are dot-peened onto metal surfaces, even when an acquired image of a 2D matrix symbol presents individual modules as rings or "donuts", with the center of each ring having a value (black or white) that is the opposite of the actual intended value of the module. After image processing according to the invention, each distorted module reliably represents the data value of the corresponding module of the original 2D matrix symbol. Regardless of the physical depth of the dots of the symbol peened on the metal surface, or the illumination set up for viewing the metal surface, conventional decoding algorithms are able to correctly read the symbol after image processing according to the invention. The invention also enables reliable and robust reading of 2D matrix symbols when a symbol is marked on metal and then covered with paint, even though the paint changes the appearance of the modules due to the build-up of paint caught in the basin of each peened module of the symbol, thereby changing the polarity of at least some of the modules.

BRIEF DESCRIPTION OF THE DRAWING

The invention will be more fully understood by reference to the detailed description, in conjunction with the following figures, wherein:

FIG. 8 (a-1) is a one-dimensional gray value profile of two modules separated by a third module of opposite polarity of FIG. 2A;

FIG. 8 (a-2) is a one-dimensional gray value profile of two separate modules of FIG. 2A after the noise reduction step 404 of FIG. 4;

FIG. 8 (a-3) is a one-dimensional gray value profile of two separate modules of FIG. 2A after the sharpening step 406 of FIG. 4;

FIG. 8 (a-4) is a one-dimensional gray value profile of two separate modules of FIG. 2A after the amplification step 408 of FIG. 4;

FIG. 8 (a-5) is a one-dimensional gray value profile of two separate modules of FIG. 2A after the smoothing step 410 of FIG. 4;

FIG. 8 (b-1) is a one-dimensional gray value profile of two adjacent modules of identical polarity of FIG. 2A;

FIG. 8 (b-2) is a one-dimensional gray value profile of two adjacent modules of FIG. 2A after the noise reduction step 404 of FIG. 4;

FIG. 8 (b-3) is a one-dimensional gray value profile of two adjacent modules of FIG. 2A after the sharpening step 406 of FIG. 4;

FIG. 8 (b-4) is a one-dimensional gray value profile of two adjacent modules of FIG. 2A after the amplification step 408 of FIG. 4; and FIG. 8 (b-5) is a one-dimensional gray value profile of two adjacent modules of FIG. 2A after the smoothing step 410 of FIG. 4.

DETAILED DESCRIPTION OF PREFERRED EMBODIMENTS

For purposes of illustration, symbols selected from the DataMatrix code are used as examples of two-dimensional (2D) matrix symbols to illustrate the use of the present invention for locating and/or decoding distorted two-dimensional (2D) matrix symbols. In practice, other matrix codes can also benefit from application of the present invention, such as the QRCode and MicroQRCode, for example.

The present invention facilitates locating and/or decoding distorted 2D matrix symbols that suffer from "donut" effects by applying image preprocessing. After image preprocessing according to the invention, even distorted symbols have continuous finder patterns, and distorted symbols have more accurately readable data modules. The preprocessed symbols are thereby made more suitable by the image preprocessing of the invention for conventional DataMatrix locating and decoding techniques.

Figure 1:
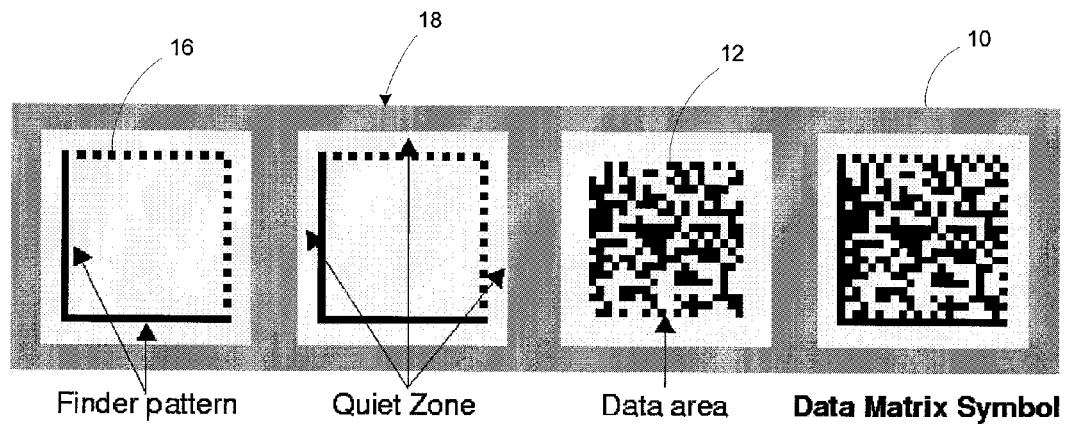
FIG. 1 is a representation of an ECC200 dark-on-light DataMatrix symbol, and its component elements.
Figures 2A, 2B:
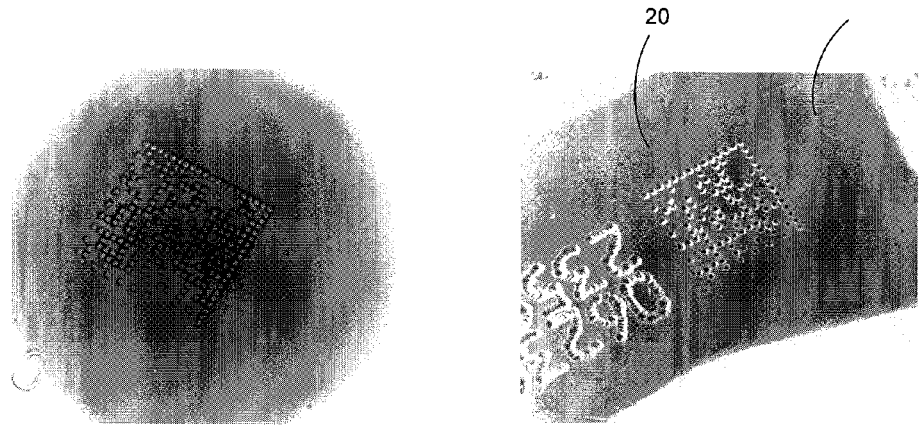
FIG. 2A is an image of a dot-peened DataMatrix symbol on a metal surface that has been painted, the paint collecting in the concavity of each dot-peened module, resulting in "donut effect" distortions.
FIG. 2B is an image of a dot-peened DataMatrix symbol distorted by "donut effects" caused by illumination of the concavity of each dot-peened module, resulting in "donut effect" distortions.

The particular image distortion corrected by the invention is herein called the "donut effect", which can occur when a dot-peened symbol is imaged with dark-field illumination, as shown in FIG. 2B, or when a symbol formed by dot-peening into a malleable surface is painted so as to fill the concave depression of each "dot" with a substance, such as paint, that modifies surface reflectance, as shown in FIG. 2A. Thus, the "donut effect" occurs in an image of a dot-peened 2D matrix symbol due to the three-dimensional form and/or lighting of each data module (represented by a "dot") of a dot-peened symbol. In a module affected by the "donut effect", the center and the border of each module are of different polarities. The polarity difference can result in data reading errors, as well as symbol location errors.

Figure 3A:
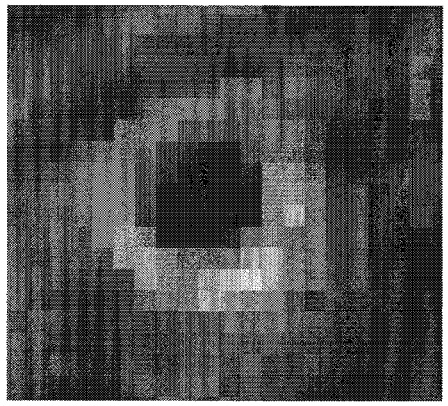
FIG. 3A is a close-up image of a single module of FIG. 2A.
Figure 3B:
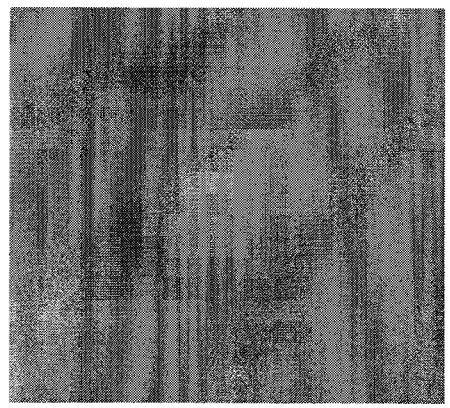
FIG. 3B is a close-up image of a single module of FIG. 2B.

With reference to FIGS. 3A and 3B, close-ups of a single module of a dot-peened symbol are shown. FIG. 3A is a close-up of a single module of FIG. 2A filled with paint, and FIG. 3B is a close-up of a single module of FIG. 2B imaged using dark field illumination. Notice that the center of each module shown is of a gray value that is similar to the gray value of the area surrounding the module. This similarity results in confusion and/or ambiguity regarding the data value represented by a module. Further, since finder patterns are formed from a plurality of closely spaced dot peens, the "donut effect" reduces the likelihood that a finder pattern so-formed will be accurately located by known methods for locating 2D matrix symbols.

To solve the problem of reliably locating and decoding 2D matrix symbols distorted by the "donut effect", the invention changes the original gray level image of FIGS. 2A and 2B to a transformed image wherein the center of each module appears clearly different from the background, and the finder pattern that includes a plurality of dot peens appears more as a continuous line. In particular, the center of each module is made to be more similar to the outer portion of the module than to the background that surrounds the module, without allowing the outer portion of the module to spread into adjacent matrix locations. To provide the transformed image, the present invention applies several well-known image processing operations in a particular sequence that will be explained in further detail below.

Figure 4:
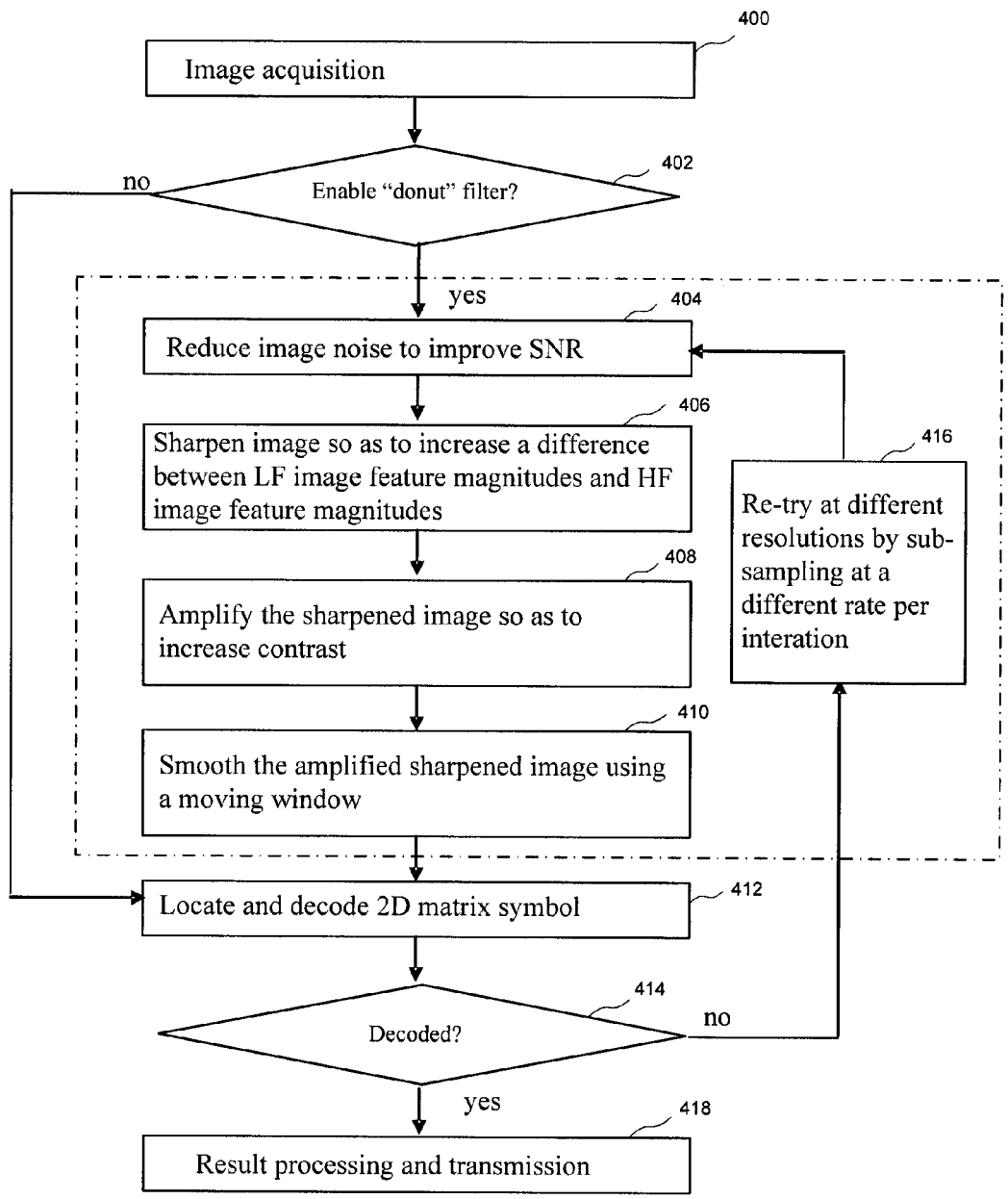
FIG. 4 is a flow chart of an embodiment of the invention.

FIG. 4 is a flow diagram of a matrix code reading system that includes image processing 420 according to the invention that removes the distortion of the "donut effect" when selected by a user 402, or when such functionality is otherwise deemed desirable.

Referring to FIG. 4, an image is acquired 400 of a 2D matrix symbol for locating and/or decoding. This step captures an image of an object that incorporates a 2D matrix symbol, such as the image of FIG. 2B, and stores the image as a two-dimensional gray-level value array, also referred to as an "image" having an array of "pixels". The size (in pixels) of an individual module of a 2D matrix symbol is determined by the optics and image formation system that are used for image acquisition. The module size in pixels lies in a known range, e.g., 3 to 15 pixels per module, for a given image acquisition setting. For a typical image acquisition setting, this could correspond to about 5 mil to 20 mil per module on a real object.

Next, a decision is made at step 402 as to whether the image pre-processing method of the invention is to be performed on the acquired image, referred to herein as "Enable the 'donut' filter" 402, which effectively processes the acquired image having distorted 2D matrix symbols so as to remove the "donut effect" distortion such that location and/or decoding of the image of the 2D matrix symbols can be performed more robustly. The decision can be made by a human operator, or can be determined by an automated process.

Note that the image pre-processing method of the invention, as shown within the dotted line 420 of FIG. 4, can be used prior to locating a 2D matrix code, and can thereby enhance the performance of any location method that seeks the continuous finder pattern 14 of a 2D matrix symbol 10, while also enhancing the performance of decoding a distorted 2D matrix symbol. Alternatively, the image pre-processing method of the invention can take known location information of a 2D matrix symbol, perform image pre-processing according to the invention, and then perform a symbol decoding operation, such as according to the "Reference locate and decode algorithm" 412 as know in the art.

To perform the image pre-processing of the invention, it is sometimes useful to reduce image noise 404. This serves to increase the image signal-to-noise ratio, which can be necessary in some applications of the invention to achieve acceptable levels of accuracy and robustness. One way to reduce image noise is to apply a smoothing filter to the raw image. It is important to reduce noise especially when image signal amplification will be used in later steps. Smoothing can be performed by convolving the image with a kernel of a size that is much smaller than the expected module size (for example, a 3×3 pixel kernel for smoothing an image of a module size of 5 to 10 pixels). This kernel can be an averaging kernel with flat weights, or a Gaussian kernel, or other smoothing kernels, or median filtering, as described in John C. Russ, *The Image Processing Handbook*, $2^{nd}$ edition, CRC press, 1995, herein incorporated by reference. Other methods of noise reduction besides smoothing kernels can be used at this stage as well. Also, some images may not require any noise reduction.

Next, the image is "sharpened" 406 so as to increase a difference between low frequency image feature magnitudes, and high frequency image feature magnitudes. In some embodiments, this can be accomplished by using a sharpening filter that suppresses low frequency image features that correspond to gradual overall variation in the background, while preserving or enhancing the amplitude of high frequency image features of the modules. Any sharpening filter can be used, such as a Sobel gradient magnitude operator, a Laplacian filter, a Mexican hat filter, a Roberts gradient magnitude operator, a Difference-of-Gaussians filter, a Rank filter, or a Top-hat filter. Alternatively, or additionally, any method for selectively boosting the magnitude of the high frequency image features would also be useful at the sharpening step 406.

In preferred embodiments, a sharpening filter is used that is of a size that's about at least half the size of a module.

One example of a sharpening filter, as mentioned above, is a Sobel edge detection filter that calculates gradient magnitude at each pixel. The gradient magnitude at a given pixel depends on the pixel values of the eight nearest neighbor pixels (upper, lower, left, right, and four diagonal neighbors) using the 3×3 Sobel operators.

Assuming a given pixel has a value of E, and its neighboring pixels have values A, B, C, D, F, G, H, and J as shown between the square brackets:

$$\begin{bmatrix} A & B & C \\ D & E & F \\ G & H & J \end{bmatrix},$$

then the gradient magnitudes at this pixel in the x and y directions (MagX and MagY) are calculated using the formulas:

$MagX=[(C-A)+2(F-D)+(J-G)]/4$ $MagY=[(G-A)+2(H-B)+(J-C)]/4$

The overall gradient magnitude S at this pixel is calculated as:

$S=\sqrt{MagX^2+MagY^2}$

Using this formula at a plurality of pixel locations, a gradient magnitude image can be obtained.

Next, in some embodiments, the sharpened image is amplified in magnitude 408. This step has the effect of increasing contrast, which is useful in the case of low-contrast images of 2D matrix symbols, such as in FIG. 2A. In a preferred embodiment, step 408 magnifies the gradient magnitude at each pixel by multiplying its value by a constant positive factor. This serves to improve the contrast of the obtained gradient magnitude image, for example. In particular, if a pixel at location (x,y) has a gradient magnitude value of S(x,y), then the amplified gradient magnitude value is S'(x,y) =arg Min(255,S(x,y)*k), in which k is a positive constant greater than 1.0, wherein the smaller of 255 and S(x,y)*k is selected to be S'(x,y). In some preferred embodiments, a constant of 6.0 is used. In other preferred embodiments, image amplification can also be performed using Histogram equalization, and Non-linear gray level mapping.

Figure 5A:
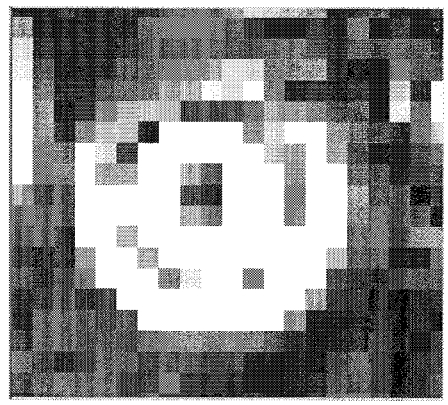
FIG. 5A is an amplified gradient magnitude image of the close-up image of FIG. 3A.
Figure 5B:
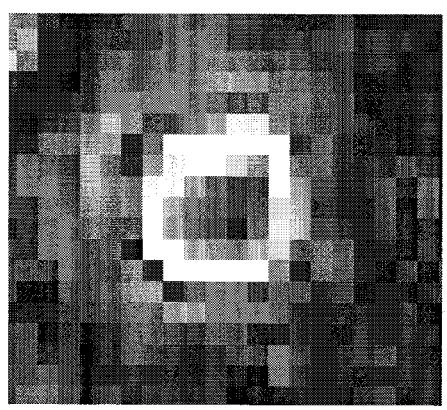
FIG. 5B is an amplified gradient magnitude image of the close-up image of FIG. 3B.

FIGS. 5A and 5B show amplified gradient magnitude images of "donut effect" distorted modules derived from the images in FIGS. 3A and 3B, respectively. Note: the module size shown is 11 pixels.

Next, the amplified sharpened image is smoothed using a moving window 410. In a preferred embodiment, the amplified gradient magnitude image is convolved with a smoothing kernel of a size that is substantially equal to the size of each module. Using a smoothing kernel in a window of the size of a module causes the high gradient components within a module to contribute to a peak in the output filtered image, thereby causing each filtered module output by the processing steps within the dotted line 420 to appear as a smooth and filled circle. Consequently, the processed image of the distorted 2D matrix symbol will be characterized by having a continuous finder pattern that is suitable for conventional 2D matrix symbol locating techniques, for example, and by having modules wherein the center of each module is of the intended polarity so as to ensure robust accuracy when conventional 2D matrix symbol sampling and decoding techniques are applied.

A variety of smoothing kernels can be used, including Gaussian smoothing, weighted smoothing, average smoothing, morphological dilation, morphological closing (dilation and then erosion), and median filtering, for example. A typical size for a Gaussian smoothing kernel is (3*sigma)*2+1 in horizontal and vertical directions. Therefore, a two-dimensional Gaussian kernel with sigma of 1.50 can be used for images with module size of around 10 pixels. In general, sigma can be chosen as a function of module size according to the expression: (ModuleSize−1)/6, so that the center of a ring of ModuleSize (diameter) will be above a threshold (median of the minimal and maximal reflectance) for correct sampling and decoding. The sigma (standard deviation) of a Gaussian kernel is the radius (in pixels) containing 68% of the integrated magnitude of the coefficients. Alternatively, the size of smoothing filters other than the Gaussian can be chosen as approximately the size of the modules of the 2D matrix symbol to be processed.

Figure 6A:
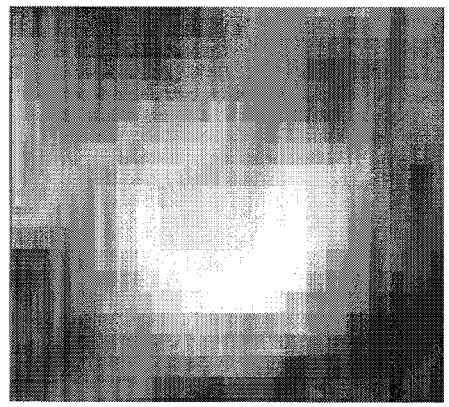
FIG. 6A is a close-up Gauss filtered image of FIG. 5A.
Figure 6B:
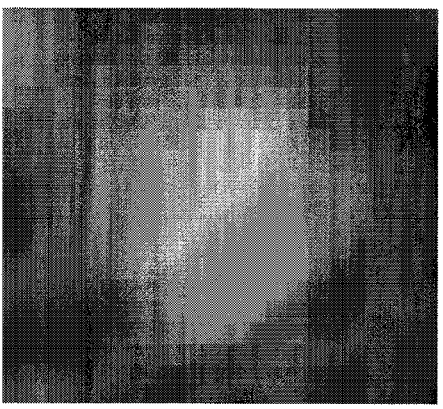
FIG. 6B is a close-up Gauss filtered image of FIG. 5B.

This step ensures that in the smoothed gradient magnitude image, the center of a foreground module has a gray level higher that that of the background. When using the result image as the input to the Reference Locate and Decode algorithm, or any other conventional locating, sampling, and decoding algorithms, the locating, sampling, and the decoding steps will be successful because the input image will satisfy the assumption of solid foreground modules. FIGS. 6A and 6B show the smoothed images of FIGS. 5A and 5B, respectively.

In a preferred embodiment, the smoothing filter is applied to the sharpened image, or to the amplified sharpened image, as a moving window that contains the smoothing filter. The step-size of the window movement depends on whether the location of the distorted 2D matrix symbol is known or not known. If the location is known, then the window can move in jumps the size of a module, such that the smoothing filter of the window is applied only at known sampling positions of the 2D matrix symbol. If the location of the distorted 2D matrix symbol is not known, then the window moves in jumps the size of a pixel, or even in sub-pixel increments, so as to be able to determine the location of the distorted 2D matrix symbol with a precision sufficient for the particular application.

Next, the 2D matrix symbol in the image processed by the image processing steps of the invention 420 is located (only if the location is not already known) and then sampled and decoded 412. There are many methods known and available for locating, sampling, and decoding 2D matrix symbols. One such method is the Reference Locate and Decode algorithm for use with DataMatrix 2D matrix symbols, i.e., the DataMatrix reference decode algorithm as described in "ISO/IEC2000: 16022, Information technology—International symbology specification—Data matrix".

Next, if the distorted 2D matrix symbol is successfully located and decoded 414, the result is then processed and possibly transmitted 418.

If the distorted 2D matrix symbol is not successfully located and decoded 414, the image processing steps described above are executed again 416, but starting with a sub-sampled image of the distorted 2D matrix symbol. The rate of sub-sampling can start at 2, and the entire sequence of image processing in 420 can be repeated at a variety of sub-sampling rates until the distorted 2D matrix symbol is successfully located and decoded. For example, step 416 sub-samples the starting image at a rate of 2, 4, 8, etc. The most useful sub-sampling rate will be a rate such that the module size in one of the sub-sampled image is in a small range of about 5 to 10 pixels. This step 416 enables the code reading system to deal with a large range of module sizes.

Figure 7A:
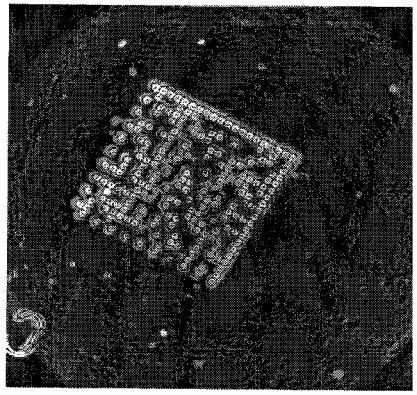
FIG. 7A is an amplified gradient magnitude image of FIG. 2A, k=6.
Figure 7B:
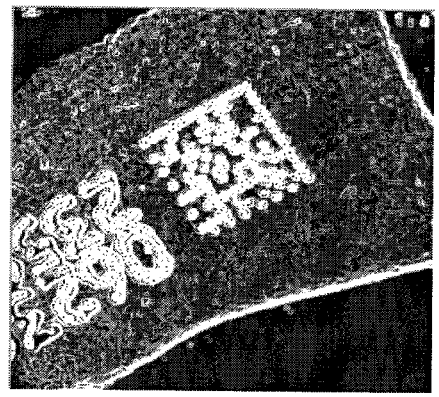
FIG. 7B is an amplified gradient magnitude image of FIG. 2B, k=6.

FIGS. 7A and 7B are amplified sharpened images of FIGS. 2A and 2B, where the amplification constant k=6. Further smoothing is needed to make the 2D matrix symbol more easily located and decoded.

Figure 7C:
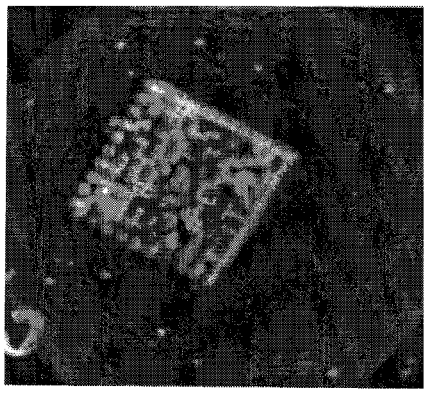
FIG. 7C is a Gauss filtered image of FIG. 7A, module size=11 pixels, sigma=1.5.
Figure 7D:
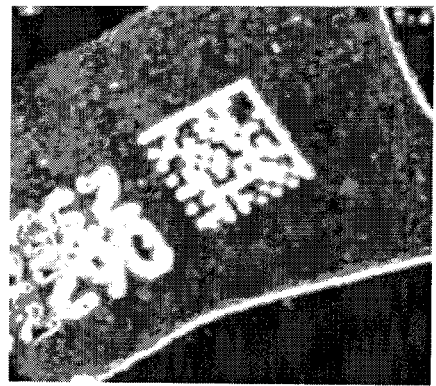
FIG. 7D is a Gauss filtered image of FIG. 7B, module size=11 pixels, sigma=1.5.

FIGS. 7C and 7D show the images of FIGS. 2A and 2B, respectively, after the sharpening, amplification, and smoothing steps of the invention, as illustrated in FIG. 4. Notice that the discontinuous finder patterns of FIGS. 2A and 2B have become more continuous, making them more suitable for locating with standard location methods for 2D matrix symbols, such as the Reference Locate and Decode algorithm for use with DataMatrix 2D matrix symbols, i.e., the DataMatrix reference decode algorithm as described in "ISO/IEC2000: 16022, Information technology—International symbology specification—Data matrix". Also notice that the module in FIGS. 7C and 7D now appears solid white, making them more representative of the intended data of the 2D matrix symbol. Consequently, the image processing of the invention has made the 2D matrix symbols of FIGS. 2A and 2B more reliably and accurately locatable and decodable.

FIGS. 8 (*a*-1) through 8 (*a*-5) show one-dimensional gray value profiles taken across two modules separated by a third module of opposite polarity of a 2D matrix symbol shown in FIG. 2A at successive stages of image processing set forth in FIG. 4.

In particular, FIG. 8 (*a*-1) is a one-dimensional gray value profile of two separate modules of FIG. 2A prior to processing by the steps in FIG. 4. This perspective helps to show that any data encoded in the modules is difficult to recognize.

FIG. 8 (*a*-2) is a one-dimensional gray value profile of two separate modules of FIG. 2A after the noise reduction step 404 of FIG. 4. This profile starts to reveal some of the encoded data, but the data is still difficult to recognize.

FIG. 8 (*a*-3) is a one-dimensional gray value profile of two separate modules of FIG. 2A after the sharpening step 406 of FIG. 4. This profile is even more revealing of the data of the modules, but detection of this data is potentially problematic.

FIG. 8 (*a*-4) is a one-dimensional gray value profile of two separate modules of FIG. 2A after the amplification step 408 of FIG. 4. This profile now strongly indicates the data of the modules, but there are still features that can introduce confusion.

FIG. 8 (*a*-5) is a one-dimensional gray value profile of two separate modules of FIG. 2A after the smoothing step 410 of FIG. 4. Comparing this profile to the profile prior to the image processing of the invention, it is evident that the data of the modules has been transformed into a fully and robustly detectable form.

FIGS. 8 (*b*-1) through 8 (*b*-5) show one-dimensional gray value profiles taken across two adjacent modules of the same polarity of a 2D matrix symbol shown in FIG. 2A at successive stages of image processing set forth in FIG. 4.

FIG. 8 (*b*-1) is a one-dimensional gray value profile of two adjacent modules of FIG. 2A. This perspective helps to show that continuity of adjacent finder modules is difficult to recognize.

FIG. 8 (*b*-2) is a one-dimensional gray value profile of two adjacent modules of FIG. 2A after the noise reduction step 404 of FIG. 4. This profile starts to reveal some of the continuity, but the continuity is still difficult to recognize.

FIG. 8 (*b*-3) is a one-dimensional gray value profile of two adjacent modules of FIG. 2A after the sharpening step 406 of FIG. 4. This profile is even more revealing of the continuity of the modules, but detection of this continuity is potentially problematic.

FIG. 8 (*b*-4) is a one-dimensional gray value profile of two adjacent modules of FIG. 2A after the amplification step 408 of FIG. 4. This profile now strongly indicates the continuity of the modules, but there are still features that can introduce confusion.

FIG. 8 (*b*-5) is a one-dimensional gray value profile of two adjacent modules of FIG. 2A after the smoothing step 410 of FIG. 4. Comparing this profile to the profile prior to the image processing of the invention, it is evident that the continuity of the modules has been clearly established.

Other modifications and implementations will occur to those skilled in the art without departing from the spirit and the scope of the invention as claimed. Accordingly, the above description is not intended to limit the invention except as indicated in the following claims.

The invention claimed is:

1. A method for processing an image of a two-dimensional (2D) matrix symbol having a plurality of data modules and a discontinuous finder pattern, each distorted by "donut effects" such that a resulting processed image contains an image of the 2D matrix symbol having a continuous finder pattern suitable for conventional 2D matrix symbol locating techniques, and having a plurality of data modules, each data module having a center more truly representative of intended data, and suitable for conventional 2D matrix symbol sampling and decoding, the method comprising:

sharpening the distorted image of the 2D matrix symbol so as to increase a difference between low frequency image feature magnitudes and high frequency image feature magnitudes, thereby providing a sharpened image; and smoothing the sharpened image using a moving window over the sharpened image so as to provide a smoothed image, the moving window and a module of the 2D matrix code being of substantially similar size.

2. The method of claim 1, wherein the moving window visits a plurality of module locations.

3. The method of claim 1, wherein the moving window visits a plurality of pixel locations.

4. The method of claim 1, wherein the moving window visits a plurality of sub-pixel locations.

5. The method of claim 1, wherein sharpening includes:
using a Sobel gradient magnitude operator.

6. The method of claim 1, wherein sharpening includes:
using one of a Laplacian filter; a Mexican hat filter; a Roberts gradient magnitude operator; a Difference-of-Gaussian filter; a Rank Filter; and a Top-hat filter.

7. The method of claim 1, wherein smoothing the sharpened image using a moving window includes:
applying a weighted smoothing function within the moving window.

8. The method of claim 7, wherein the weighted smoothing function is a Gaussian function.

9. The method of claim 1, wherein smoothing the sharpened image using a moving window includes:
applying an average smoothing function within the moving window.

10. The method of claim 1, wherein smoothing the sharpened image using a moving window includes:
morphological dilation.

11. The method of claim 1, wherein smoothing the sharpened image using a moving window includes:
morphological dilation, followed by morphological erosion.

12. The method of claim 1, wherein smoothing the sharpened image using a moving window includes:
Median filtering.

13. The method of claim 1, wherein the Gaussian function of the moving window is sized such that the sigma of the Gaussian function is one sixth of one less than a size of a module.

14. The method of claim 1, wherein the moving window is sized such that, at a center of a "donut effect" ring that is substantially equal in size to a module size, a magnitude of the smoothed image at the center will be sufficient for correct sampling and decoding.

15. The method of claim 1, further comprising:
prior to sharpening, removing noise so as to improve signal-to-noise-ratio.

16. The method of claim 15, wherein removing noise includes:
applying a smoothing filter to the image of a 2D matrix code.

17. The method of claim 16, wherein the smoothing filter is a kernel of a size that is substantially smaller with respect to a module of the 2D matrix code.

18. The method of claim 15, wherein removing noise includes at least one of:
Gaussian smoothing, weighted smoothing, average smoothing, and median filtering.

19. The method of claim 1, further comprising:
amplifying the sharpened image so as to increase contrast in the sharpened image.

20. The method of claim 19, wherein amplifying the sharpened image includes:
multiplying each gray value of the sharpened image by a constant factor.

21. The method of claim 19, wherein amplifying the sharpened image includes:
histogram equalization.

22. The method of claim 19, wherein amplifying the sharpened image includes:
non-linear gray level mapping.

23. The method of claim 1, further comprising:
repeating the method at different resolutions so as to expand operating range over a variety of module sizes.

24. The method of claim 20, wherein retrying at different resolutions includes:
sub-sampling the image prior to repeating the method.

25. The method of claim 1, wherein the method is repeated so as to repeat smoothing the sharpened image using a moving window by using a moving window of a different size for each repetition of the method, if the module size is unknown.

26. The method of claim 1, wherein the "donut" effect refers to any imperfection in shape of a module that would prevent a module from contacting a neighboring module of the same polarity, and would result in module having a pixel value of a wrong polarity at its geometric center or its center-of-mass.

27. The method of claim 26, wherein imperfections in shape include:
donut shape, square ring, crescent, and oval.

28. A method for decoding a distorted image of a 2D matrix symbol, comprising:
sharpening the distorted image of the 2D matrix symbol so as to increase a difference between low frequency image feature magnitudes and high frequency image feature magnitudes, thereby providing a sharpened image;
smoothing the sharpened image using a moving window over the sharpened image so as to provide a smoothed image, the moving window and a module of the 2D matrix code being of substantially similar size; and
sampling and decoding the 2D matrix symbol.

29. The method of claim 28, further comprising:
locating the 2D matrix symbol after preprocessing.

30. The method of claim 28, further comprising:
locating the 2D matrix symbol before preprocessing.

31. A method for verifying a 2D matrix symbol, comprising:
sharpening an image of the 2D matrix symbol so as to increase a difference between low frequency image feature magnitudes and high frequency image feature magnitudes, thereby providing a sharpened image;
smoothing the sharpened image using a moving window over the sharpened image so as to provide a smoothed image, the moving window and a module of the 2D matrix code being of substantially similar size;
sampling and decoding the 2D matrix symbol so as to provide decoded symbol, and a binary pattern of the decoded symbol; and
comparing the binary pattern of the decoded symbol with an ideal pattern of the decoded symbol.

* * * * *